United States Patent
Oran et al.

(10) Patent No.: US 9,979,644 B2
(45) Date of Patent: May 22, 2018

(54) LINKING TO CONTENT USING INFORMATION CENTRIC NETWORKING

(71) Applicant: Cisco Technology Inc., San Jose, CA (US)

(72) Inventors: Dave Oran, Cambridge, MA (US); Ilya Moiseenko, Los Angeles, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 544 days.

(21) Appl. No.: 14/606,810

(22) Filed: Jan. 27, 2015

(65) Prior Publication Data
US 2016/0014215 A1    Jan. 14, 2016

Related U.S. Application Data

(60) Provisional application No. 62/023,883, filed on Jul. 13, 2014.

(51) Int. Cl.
*G06F 15/16*    (2006.01)
*G06F 15/173*    (2006.01)
(Continued)

(52) U.S. Cl.
CPC ...... *H04L 45/742* (2013.01); *G06F 17/30887* (2013.01); *H04L 45/306* (2013.01);
(Continued)

(58) Field of Classification Search
CPC ......... H04L 29/06; H04L 63/08; H04L 63/10; H04L 63/061; H04L 63/062; H04L 63/12;
(Continued)

(56) References Cited

U.S. PATENT DOCUMENTS 8,645,702 B2    2/2014    Zhang et al.
2007/0204011 A1*  8/2007    Shaver ............... H04N 21/6543
                                                  709/219
(Continued)

FOREIGN PATENT DOCUMENTS

WO    2007113163 A1    10/2007

OTHER PUBLICATIONS

Jacobson, et al., "Networking Named Content", ACM CoNEXT 2009, 12 pages.
(Continued)

*Primary Examiner* — Farzana Huq
(74) *Attorney, Agent, or Firm* — Ronald Fernando

(57) ABSTRACT

In one implementation, a method includes receiving, from a link owner, a first interest message for an authorized link object, wherein the authorized link object links to content of a content owner. The method also includes transmitting, to the link owner, a second interest message for a proposed link object based on the first interest message. The method further includes receiving, from the link owner, the proposed link object, wherein the proposed link object comprises a first signature generated by the link owner. The method further includes determining whether the link owner is allowed to link to the content and transmitting, to the link owner, the authorized link object when the link owner is allowed to link to the content, wherein the authorized link object comprises a first name for the content, the first signature, and a second signature generated by a content owner.

28 Claims, 9 Drawing Sheets

(51) Int. Cl.
*H04L 12/747* (2013.01)
*H04L 29/08* (2006.01)
*G06F 17/30* (2006.01)
*H04L 12/927* (2013.01)
*H04L 29/06* (2006.01)
*H04L 12/725* (2013.01)

(52) U.S. Cl.
CPC .......... *H04L 47/808* (2013.01); *H04L 63/101* (2013.01); *H04L 63/102* (2013.01); *H04L 67/02* (2013.01); *H04L 67/10* (2013.01); *H04L 67/16* (2013.01); *H04L 67/2804* (2013.01); *H04L 67/2842* (2013.01); *H04L 67/327* (2013.01)

(58) Field of Classification Search
CPC ............. H04L 63/0823; H04L 63/0442; H04L 63/0435; H04L 63/108; H04L 67/10; H04L 67/16; H04L 67/306; H04L 67/327; H04L 67/808; H04L 67/1095; H04L 67/2804; H04L 67/2842
USPC .......................................... 709/219, 229, 238
See application file for complete search history.

(56) References Cited

U.S. PATENT DOCUMENTS

| | | | |
|---|---|---|---|
| 2011/0289316 A1* | 11/2011 | Cremin | ................... G06F 21/31 713/168 |
| 2011/0321132 A1 | 12/2011 | Slingerland et al. | |
| 2012/0297088 A1* | 11/2012 | Wang | .................. H04L 63/0272 709/238 |
| 2013/0067594 A1 | 3/2013 | Kantor et al. | |
| 2013/0074155 A1 | 3/2013 | Huh et al. | |
| 2013/0136476 A1* | 5/2013 | Makino | ................ G03G 15/167 399/66 |
| 2014/0181226 A1 | 6/2014 | Xu et al. | |
| 2015/0248542 A1* | 9/2015 | Mahadevan | ............ G06F 21/10 726/27 |

OTHER PUBLICATIONS

Zhang, et al., "Towards Name-based Trust and Security for Content-centric Network", 6 pages.
International Search Report and Written Opinion for PCT/US2015/037271 dated Oct. 2, 2015.

* cited by examiner

LINKING TO CONTENT USING INFORMATION CENTRIC NETWORKING

RELATED APPLICATIONS

This application claims the benefit of priority under 35 U.S.C. § 119(e) of U.S. Provisional Application No. 62/023,883, filed on Jul. 13, 2014. All of the aforementioned applications are hereby incorporated by reference in their entireties for all purposes.

FIELD OF THE INVENTION

The present disclosure relates to Information Centric Networking (ICN) system architectures. More specifically, the present disclosures relates methods and systems for linking to content in ICN system architectures.

BACKGROUND

Many network architectures allow a first party (e.g., a first computing device, a first entity, a first company, etc.) to link to content that is owned, managed, and/or administered by a second party (e.g., a second computing device, a second entity, a second company, etc.). For example, in the Internet (e.g., the World Wide Web (WWW)), a first party may provide a link (e.g., a hypertext link) to content of a second party. Because content/resources on many network architectures (e.g., the Internet) may have a universally addressable identifier (e.g., a uniform resource locator (URL), a uniform resource identifier (URI), etc.), any party may create a link to the content of the second party.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

DESCRIPTION OF EXAMPLE EMBODIMENTS

Figure 1:
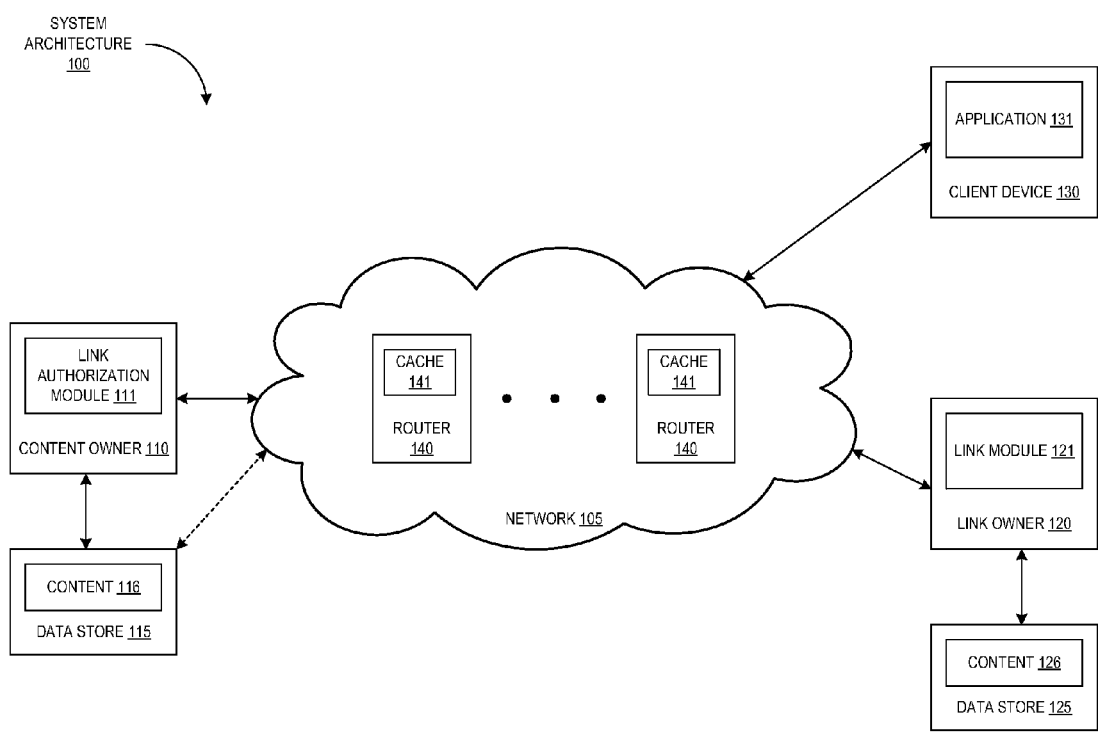
FIG. 1 is a block diagram illustrating a system architecture, in accordance with some embodiments.

Numerous details are described herein in order to provide a thorough understanding of the illustrative implementations shown in the accompanying drawings. However, the accompanying drawings show only some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein.

Overview

Various implementations disclosed herein include apparatuses, systems, and methods for requesting, generating, and/or using an authorized link object. For example, in some implementations, a method includes receiving, from a link owner, a first interest message for an authorized link object, wherein the authorized link object links to content of a content owner. The method also includes transmitting, to the link owner, a second interest message for a proposed link object based on the first interest message. The method further includes receiving, from the link owner, the proposed link object, wherein the proposed link object comprises a first signature generated by the link owner. The method further includes determining whether the link owner is allowed to link to the content and transmitting, to the link owner, the authorized link object when the link owner is allowed to link to the content, wherein the authorized link object comprises a first name for the content, the first signature, and a second signature generated by a content owner.

In other implementations, a method includes transmitting, to a content owner, a first interest message for an authorized link object, wherein the authorized link object links to content of the content owner and receiving, from the content owner, a second interest message for a proposed link object. The method also includes transmitting, to the content owner, the proposed link object, wherein the proposed link object comprises a first signature generated by a link owner. The method further includes receiving, from the content owner, the authorized link object, wherein the authorized link object comprises a first name for the content, the first signature, and a second signature generated by a content owner.

In further implementations, a method includes transmitting, to a link owner, an interest message for a link object, wherein the link object links to content of a content owner. The method also includes receiving the link object, wherein the link object comprises a first signature of the link owner, a second signature of the content owner, a first name of the content and a second name of the link object. The method further includes determining whether the link object is valid based on the first signature and the second signature and accessing the content when the link object is valid.

DETAILED DESCRIPTION

As discussed above, many network architectures (e.g., the Internet or the WWW) allow a first party to link to content that is owned, managed, and/or administered by a second party. Links may generally be unidirectional and the second party often is not aware that the first party has linked to the content of the second party. This may create problems for the second party. For example, some search engines may estimate the quality of a first resource (e.g., content) based on the quality of the other resources (e.g., other content) that link to the first resource. Thus, if another resource that links to the first resource is untrustworthy, a search engine may determine that the quality of the first resource is lower. In addition, links are not only used to forward a user to the original content, but may also be used to embed (e.g. through web browser rendering) the original content. This may make it difficult to track the ownership of the original content. For example, a content owner may not have a way to indicate that the content owner has or has not allowed a party to link to and/or embed the content of the content owner. Also, links may become broken over time. For example, the content referred to by the link may change locations and/or may not longer be available. Web browsers often do not automatically detect broken links due to the overhead of speculatively following links and preemptively downloading the content referenced by the links.

Information Centric Networking (ICN) system architectures are increasing in popularity. Examples of ICN system architectures include the Named Data Networking (NDN) system architecture and the Content-Centric Networking (CCN) system architecture. An ICN system architecture (such as an NDN system architecture) may allow a consumer (e.g., a client device) to request data using interest messages that identify the name of the requested data. A producer (e.g., a producer of the requested data, such as a server computing device) may receive the interest messages and may transmit data objects to the consumer. The interest messages and/or data objects are routed and/or forwarded through the ICN system architecture using the names in the interest messages and/or data objects.

In some embodiments, a system architecture may use an NDN system architecture. In the NDN system architecture, a content owner may allow link owners (e.g., entities that own, manage, and/or administer a link to content of the content owner) to request authorized link objects from the content owner. The content owner is made aware of link owners that wish to link to its content when the content owner receives interest messages requesting the authorized link object. The content owner may request a proposed link object from the link owner and may determine whether to allow the link owner to link to the content of the content owner by analyzing the proposed link object. If the content owner allows the link owner to link to the content of the content owner, the content owner may generate the authorized link object and may transmit the authorized link object to the link owner. The authorized link object may allow a user to verify that the content linked to (e.g., referred to) by the authorized link object is considered valid by the content owner and may allow the user to confirm that the content owner has allowed the link owner to link to the content.

Although the present disclosure may refer to the NDN system architecture, it should be understood that the NDN system architecture is merely an example architecture that may be used. Other embodiments may use other types of system architectures (e.g., CCN, Pursuit, NetInf, etc.) and the examples, implementations, and/or embodiments described herein may be used with the other types of system architectures.

FIG. 1 is a block diagram illustrating a system architecture 100, in accordance with some embodiments. The system architecture includes a content owner 110, a link owner 120, a network 105, routers 140, a client device 130, a data store 115, and a data store 125. The system architecture 100 may be an NDN system architecture. For example, a consumer (e.g., client device 130) in the system architecture 100 may use interest packets to request data and a producer (e.g., content owner 110) may use data objects (e.g., NDN data objects) to transmit the requested data. The content owner 110 may be referred to as a producer and the client device 130 may be referred to as a consumer or a requestor.

The content owner 110 may be one or more computing devices (such as a rack-mount server, a router computer, a server computer, a personal computer, a mainframe computer, a smartphone, a personal digital assistant (PDA), a laptop computer, a tablet computer, a desktop computer, etc.). The client device 130 may also be a computing device (e.g., a personal computer, a smartphone, a personal digital assistant (PDA), a laptop computer, a tablet computer, a desktop computer, etc.). The network 105 may include one or more of a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one embodiment, the content owner 110 may be a party, entity, and/or computing device that owns, manages, and/or administers content that a link owner 120 may wish to link to. In one embodiment, a link owner 120 may be a party, entity, and/or computing device that wishes to link to the content of the content owner 110.

The data store 115 may be a memory (e.g., random access memory), a cache, a drive (e.g., a hard drive), a flash drive, a database system, and/or another type of component/device capable of storing data. The data store 115 may also include multiple storage components (e.g., multiple drives or multiple databases) that may also span multiple computing devices (e.g., multiple server computers). The data store 115 includes the content 116 (e.g., NDN data objects, text, images, videos, files, webpages, books, and/or other data etc.). In one embodiment, the content owner 110 may be directly coupled to the data store 115. In another embodiment, the content owner 110 may be coupled to the data store 115 via the network 105. The data store 125 may also be a memory, a cache, a drive, a flash drive, a database system, and/or another type of component/device capable of storing data. The data store 125 may also include multiple storage components that may also span multiple computing devices. The data store 125 includes content 126.

In one embodiment, the content owner 110 may have content (e.g., NDN data objects, text, images, videos, files, webpages, books, and/or other data etc.) that other computing devices may access via the network 103. For example, the content owner 110 may allow the client device 130 to access the content 116. As discussed above, a link owner 120 may wish to include a link to the content 116 that belongs to the content owner 110. The link owner 120 may request an authorized link object from the content owner 110 (as discussed in more detail below). In one embodiment, the authorized link object may be a link to the content 116 of the content owner 110. The authorized link object may also be an NDN data object (or a CCN data object) that may indicate that a party/computing device (e.g., link owner 120) is permitted and/or authorized to link to content (e.g., authorized to link to another NDN data object). The authorized link object may also be used to determine whether the content linked (e.g., referred to) by the authorized link object is valid (e.g., may be used to indicate that the link is not broken).

The content owner 110 includes a link authorization module 111. In one embodiment, the link authorization module 111 may be an application, service, daemon, process, component, etc., that allows other computing devices (e.g., the link owner 120) to request authorization and/or permission to link to the content of the content owner 110 (e.g., content 116). In one embodiment, the link authorization module 111 may be reachable using a name for the link authorization module (e.g., a routable name or prefix). For example, the link authorization module 111 may be reachable using an interest message that includes the name of the link authorization module 111. The link authorization module 111 may receive a first interest messages (e.g., interest packets) from the link owner 120 requesting an authorized link object. The first interest message may include a second name (as discussed in more detail below). The second name may be the name of a proposed link object of the link owner 120 and may allow the link authorization module 111 to request the proposed link object from the link owner 120. The content owner 110 may transmit a second interest message to the content owner 110 to request the proposed link object. The link authorization module 111 may analyze the proposed link object and determine whether to permit and/or authorize the link owner 120 to link to the content 116 (as discussed in more detail below). If the link authorization module permits and/or authorizes the link owner 120 to link to the content 116, the authorization module 111 may transmit the authorized link object to the link owner 120. The contents of the authorized link object and the proposed link object are discussed in more detail below.

The link owner 120 includes a link module 121. In one embodiment, the link module 121 may be application, service, daemon, process, component, etc., that may request the authorized link object from the content owner 110 (e.g., may request permission to link to content 116). The link module 121 may transmit the first interest message (to request the authorized link object) to the link authorization module 111. As discussed above, the first interest message may include the name of the link authorization module 111. The name of the link authorization module 111 may be known a priori by the link module 121 or may be determined by the link authorization module 111. For example, the link module 121 may access a database, a table, etc., that may include the name of the link authorization module 111. The link module 121 may also access a web service to obtain the name of the link authorization module 111. In another example, the link module 121 may be able to determine the name of the link authorization module 111 based on the name of the content 116 (e.g., based on a prefix or portion of the name of the content 116). The link module 121 may receive the second interest message from the content owner 110 and may transmit the proposed link object to the content owner 110 based on (e.g., in response to) the second interest message. As discussed above, the link module 121 may receive the authorized link object if the link owner 120 is permitted and/or authorized to link to the content 116.

The client device 130 includes an application 131. Application 131 may be an application (e.g., a web browser) that allows users to access content (e.g., content 116 and 126). The content 126 may include a link object (e.g., an authorized link object) that links to the content 116. The application 131 may analyze the link object to determine whether the link object is valid. For example, the application 131 may determine whether the link object includes a first signature generated by the link owner 120 and a second signature generated by the content owner 110. In one embodiment, the application 131 may determine that the link object is invalid if either signature is missing. In another embodiment, the application may determine that the link object is invalid if either of the signatures is expired and/or invalid. For example, the application 131 may use the public keys of the link owner 120 and the content owner 110 to determine if the first and second signatures are expired and/or invalid. If one or more of the signatures are invalid, then the application 131 may determine that the link has been tampered with and cannot be accessed safely. In one embodiment, the application 131 may also use the public key of the content owner 110 to determine whether the link object is valid. For example, if the content owner's key is expired or has been revoked, then the link is no longer valid or the link owner 120 is no longer allowed to link to the content.

The system architecture 100 also includes routers 140. Routers 140 may be communication devices (e.g., computing devices such as routers, switches, etc.) that may route and/or forward data between the content owner 110 and the client device 130. For example, router 140 may receive a request for an authorized link object from the link owner 120 and may forward the request to the content owner 110. The content owner 110 may transmit the authorized link object to the link owner 120 via the routers 140. Each router 140 may include a cache 141. As discussed above, the system architecture 100 may be an NDN system architecture. The NDN system architecture may allow the routers 140 to store (e.g., cache) NDN data objects (e.g., authorized link objects, proposed link objects, etc.) in their respective caches 141. When a router 140 receives a request (e.g., an interest packet) for an NDN data object from the client device 130 and the router 140 has the NDN data object stored in its cache 141, the router 140 may transmit the NDN data object toward the client device 130 in response to the request instead of forwarding the request to the content owner 110. This may reduce the amount of network congestion in the network 105. In one embodiment, the caches 141 may also allow multi-path and multi-destination routing without using domain name system (DNS) lookups, load balancers, and proxies.

In one embodiment, the system architecture 100 may allow the content owner 110 to be notified when a link owner 120 wishes to link to the content 116. The content owner 110 may authorize and/or permit the link owner to link to the content 116. The content owner 110 may be able to track and/or monitor which entities (e.g., link owners) are requesting authorization/permission to link to content 116 because the content owner 110 is notified when an entity wishes to link to the content 116 (e.g., when the link owner 120 transmits the first interest message and/or the proposed link object). In another embodiment, the system architecture 100 may allow the link owner 120 to prove to users (e.g., client device 130) that the link owner 120 is allowed (e.g., is permitted and/or authorized) to link to the content 116 of the content owner 110. In a further embodiment, the system architecture 100 may allow users to verify the link to the content 116 (e.g., a link object) and/or to verify that the link owner has obtained permission from the content owner 110 to link to the content 116.

Although FIG. 1 may refer to the NDN system architecture, it should be understood that the NDN system architecture is merely an example architecture that may be used. Other embodiments, may use other types of system architectures (e.g., CCN, Pursuit, NetInf, etc.).

Figure 2:
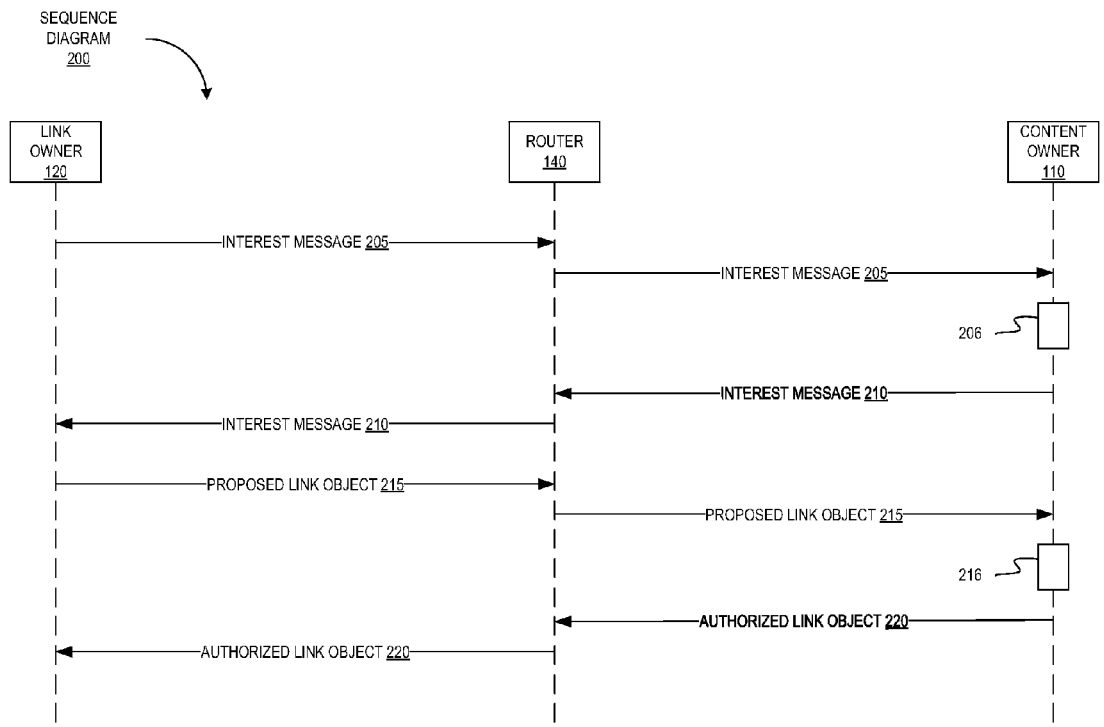
FIG. 2 is a sequence diagram illustrating an example process for linking to content, in accordance with some embodiments.

FIG. 2 is a sequence diagram 200 illustrating an example process for linking to content, in accordance with some embodiments. As discussed above in conjunction with FIG.

1, a link owner 120 may wish to link to the content 116. For example, a link owner 120 may wish to link to the content 116 within the content 126 of the link owner 120 (e.g., a webpage of the link owner 120 may include a link to a webpage of the content owner 110). As illustrated in FIG. 2, the link owner 120 may transmit an interest message 205 to request a link to the content 116. For example, the link owner 120 may transmit the interest message 205 to request an authorized link object. The interest message 205 may be received by the router 140 (e.g., received at a first network interface or first network port) and the router 140 may forward the message to the content owner 110 (e.g., may forward the message using a second network interface or second network port). The interest message 205 may include the name of a link authorization module of the content owner 110 (e.g., the name of the link authorization module 111). The name of the link authorization module may allow the router 140 to forward (e.g., route) the interest message 205 to the content owner 110 (e.g., to the link authorization module of the content owner 110). As discussed above, the name of the link authorization module may be previously known to the link owner 120 and/or may be determined based on the name of the content that the link owner 120 wishes to link to.

In one embodiment, the interest message 205 may also include a second name (e.g., a second, separate name). The second name may be the name of the proposed link object 215. The contents of the proposed link object are discussed in more detail below. Including the second name in the interest message 205 may allow the link owner 120 to provide the name of the proposed link object (e.g., the second name) to the content owner so that the content owner 110 is able to request the proposed link object from the link owner 120 (e.g., so that the content owner 110 is able to transmit interest message 210). The second name may be referred to as a reflexive name or a data object locator. In one embodiment, the link owner 120 may generate the proposed link object prior to transmitting the interest message 205. In another embodiment, the link owner 120 may generate the proposed link object after receiving the interest message 210.

When the content owner 110 receives the interest message 205, the content owner 110 may be notified that the link owner 120 wishes to link to content of the content owner 110. In one embodiment, the content owner 110 may optionally determine whether to transmit interest message 210 to the link owner (to request the proposed link object) at block 206. For example, as discussed above, the interest message 205 may include a second name and the second name may be the name of the proposed link object (e.g., may be the name of the link to the content of the content owner 110). The content owner 110 may analyze the second name (e.g., analyze a portion or prefix of the second name) to determine whether to transmit the interest message 210 to the link owner 120. For example, the second name may include the name of the link owner 120 (e.g., the name of the company of the link owner 120) and the content owner 110 may determine whether the link owner 120 is trustworthy based on the name of the link owner 120. If the content owner 110 determines that the interest message 210 should be transmitted to the link owner 120 (e.g., determines that the link owner 120 may be trustworthy), the content owner 110 proceeds to transmit the interest message 210 to the link owner 120. If the content owner 110 determines that the interest message 210 should not be transmitted to the link owner 120, the content owner 110 may refrain from transmitting the interest message 210 (e.g., may not transmit the interest message 210).

In one embodiment, the second name (e.g., the name of the proposed link object) may be a routable name. A routable name may be a name allows an interest message or a data object (e.g., an NDN data object) to be routed by a router (e.g., router 140) using a forwarding information base (FIB) of the router. For example, a routable name may be a name that is globally known and/or recognized in an NDN network architecture. In another example, a routable name may be a name where a prefix and/or a portion of the name exists in the FIB of the router. In another embodiment, the second name may be a non-routable name. A non-routable name may be a name that is not globally known and/or recognized in an NDN network architecture. A non-routable name may also be a name where a prefix/portion of the name does not exist in the FIB of the router. The FIB is discussed in more detail below in conjunction with FIGS. 4A through 4D.

When the content owner 110 transmits the interest message 210, the interest message 210 is received by the router 140 and the router 140 forwards (e.g., routes) the interest message 210 to the link owner 120 (e.g., routes or forward the interest message 210 using the FIB and/or PIT). When the link owner 120 receives the interest message 210, the link owner 120 may respond to the interest message 210 by transmitting the proposed link object 215. As discussed above, the proposed link object 215 includes the second name (e.g., the name of the proposed link object 215). The router 140 may receive the proposed link object 215 and may forward (e.g., route) the proposed link object 215 to the content owner 110. The proposed link object 215 may satisfy the interest message 205.

In one embodiment, the content owner 110 may receive the proposed link object 215 and may determine whether to transmit the authorized link object 220 to the link owner 120 based on the proposed link object 215 at block 216. For example, the content owner 110 (e.g., the link authorization module of the content owner 110) may analyze the proposed link object and may determine whether the signature of the proposed link object 215 is valid. In another example, the content owner 110 may also analyze the target content name (e.g., the name of the content of the content owner 110 that link owner 120 wishes to link to) and may determine whether other parties (e.g., the link owner 120, other computing devices, etc.) should have access to the content using the proposed link name. In a further example, the content owner may also analyze the name of the proposed link object to determine whether link owner may be trustworthy. If the content owner 110 determines that the link owner 120 is not allowed (e.g., is not permitted and/or authorized) to link to the content based on the proposed link object 215, the content owner 110 may refrain from generating the authorized link object 220 and/or transmitting the authorized link object 220 to the link owner 120 (not shown in FIG. 2). If the content owner 110 determines that the link owner 120 is allowed (e.g., is permitted and/or authorized) to link to the content based on the proposed link object 215, the content owner 110 may generate the authorized link object 220 and may transmit the authorized link object 220. The router 140 may receive the authorized link object 220 and may forward (e.g., route) the authorized link object 220 to the link owner 120. The authorized link object 220 may satisfy the interest message 210.

In one embodiment, the authorized link object 220 may be wrapped in an NDN data object that has the name of the link authorization module because the interest message 210 has the name of the link authorization module. For example, authorized link object 220 may be included in and/or may be part of an NDN data object. In another embodiment, the authorized link object 220 may be wrapped in a CCN data object. For example, authorized link object 220 may be included in and/or may be part of a CCN data object.

In other embodiment, the link owner 120 may use other messages, functions, and/or operations to provide the content owner with the proposed link object 215. For example, the link owner 120 may not use the second name (e.g., a reflexive name/data locator) in the interest message 205. The link owner 120 may generate the proposed link object 215 (as discussed above). The link owner 120 may transmit a different type of interest message 205 that includes a payload to the content owner 110. The link owner 120 may include the proposed link object 215 in the payload of the interest message 205. The content owner 110 may receive the proposed link object 215 without transmitting interest message 210 because the proposed link object 215 may be part of the initial interest message 205 received from the link owner 120.

Figure 3A:
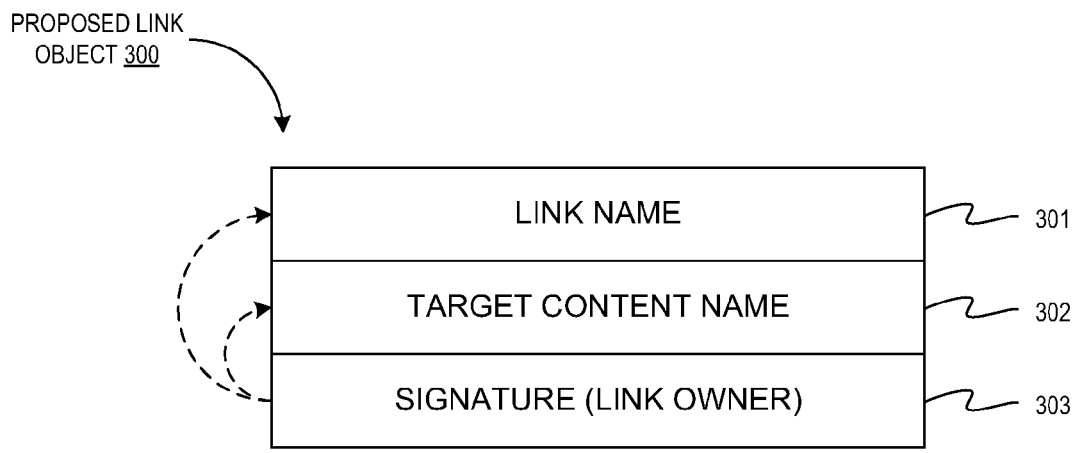
FIG. 3A is a block diagram illustrating an example proposed link object, in accordance with some embodiments.

FIG. 3A is a block diagram illustrating an example proposed link object 300, in accordance with some embodiments. As discussed above in conjunction with FIGS. 1 and 2, a link owner (e.g., link owner 120) may generate and/or transmit the proposed link object 300 to a content owner (e.g., content owner 110) based on (e.g., in response to) an interest message (e.g., an NDN interest message/packet) received from the content owner. The proposed link object 300 includes a link name 301, a target content name 302, and a signature 303. The signature 303 may include one or more of the following: 1) a secure hash of the link name 301 and the target content name 302; 2) an indicator of which hashing algorithm was used to generate the secure hash (e.g., SHA-1, MD5, etc.); 3) an indicator of which signing algorithm was used to generate the signature 303; and 4) an identifier that indicates which public key may be used to verify the signature 303 (e.g., a key locator field). In other embodiments, the signature 303 may include additional fields and/or data.

As discussed above, the proposed link object 300 may be a proposed link to content of a content owner (e.g., content owned, managed, and/or administered by the content owner). For example, the proposed link object 300 may be viewed as a request to link to the content. The proposed link object 300 may be transmitted to a content owner based on (e.g., in response to) an interest message received from the content owner requesting the proposed link object 300. In one embodiment, the target content name 302 may be the name of the content of the content owner. For example, the target content name 302 may be the name of the content (of the content owner) that the proposed link object may link to. The link name 301 may be the name of the proposed link (e.g., may be the proposed name of the authorized link object). The proposed link object 300 also includes signature 303. In one embodiment, the signature 303 may securely bind the link owner (e.g., the entity that generated the proposed link object 300), the link name 301, and the target content name 302. For example, the signature 303 may be generated using a private key (e.g., a secret key) of the link owner, the link name 301, and the target content name 302. The signature 303 together with a public key of the link owner may be used to determine and/or confirm the identity of the link owner.

Figure 3B:
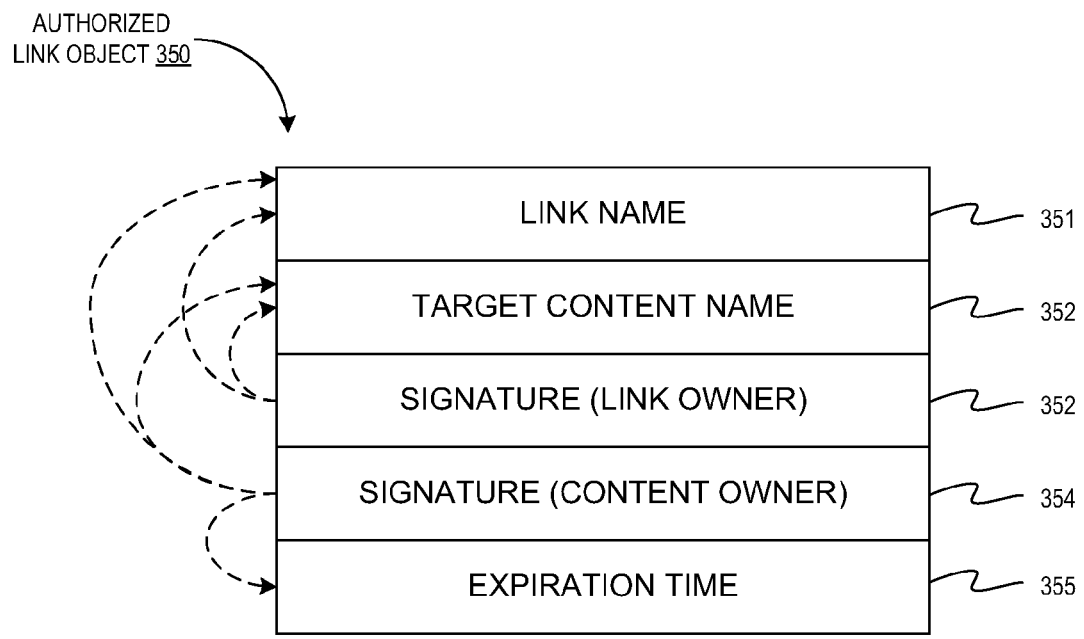
FIG. 3B is a block diagram illustrating an example authorized link object, in accordance with some embodiments.

FIG. 3B is a block diagram illustrating an example authorized link object 350, in accordance with some embodiments. As discussed above in conjunction with FIGS. 1 and 2, a content owner (e.g., content owner 110) may generate and/or transmit the authorized link object 350 to a link owner (e.g., link owner 120) based on (e.g., in response to) an interest message (e.g., an NDN interest message/packet) received from the link owner. The authorized link object 350 includes a link name 351, a target content name 352, a signature 353, a signature 354, and an expiration time 355. In one embodiment, the expiration time 355 may be optional (e.g., the expiration time 355 may not be part of the authorized link object 350). The signature 353 may include one or more of the following: 1) a secure hash of the link name 351 and the target content name 352; 2) an indicator of the hashing algorithm used to generate the secure hash; 3) an indicator of which signing algorithm was used to generate the signature; and 4) an identifier that indicates which public key may be used to verify the signature 353 (e.g., a key locator field). The signature 354 may include one or more of the following: 1) a secure hash of the link name 351, the target content name 352, and the expiration time 355 (when the expiration time 355 is included); 2) an indicator of the hashing algorithm used to generate the secure hash; 3) an indicator of which signing algorithm was used to generate the signature 354; and 4) an identifier that indicates which public key may be used to verify the signature 354 (e.g., a key locator field). In other embodiments, the signatures 353 and/or 354 may include additional fields and/or data.

As discussed above, the authorized link object 350 may be a link to content of a content owner (e.g., content owned, managed, and/or administered by the content owner). The authorized link object 350 may indicate that the content owner has allowed (e.g., authorized and/or permitted) the link owner to link to the content. The authorized link object 350 may be transmitted to a content owner based on (e.g., in response to) an interest message received from the content owner requesting the authorized link object 350. In one embodiment, the target content name 352 may be the name of the content of the content owner. For example, the target content name 352 may be the name of the content (of the content owner) that the authorized link object may link to. The link name 351 may be the name of the authorized link to the content of the content owner (e.g., may be the name of the authorized link object). The authorized link object 350 also includes signature 353. In one embodiment, the signature 354 may securely bind the content owner (e.g., the entity that generated the authorized link object 350), the link name 351, the target content name 352, and the signature 353. For example, the signature 354 may be generated using a private key (e.g., a secret key) of the content owner, the link name 351, the target content name 352, and the expiration time 355 (if the expiration time 355 is included). The signature 354 may be verified using a public key of the content owner and/or may be used to determine and/or confirm the identity of the content owner. The signature 353 may be verified using a public key of the link owner and/or may be used to confirm the identity of the link owner.

In one embodiment, the content owner may create the public/private key pair and/or the signature 354 such that the private key and public key of the content owner and/or the signature 354 expire after a period of time (e.g., the private key and public key of the content owner has a limited lifetime). This may allow the content owner to limit the amount of time that a link owner may be allowed to link to the content of the content owner. For example, the public key of the content owner may expire one month after the authorized link object is created. This may allow the link owner to link to the content of the content owner for one month. After the month has passed, the public key may expire and a user may determine that the link owner no longer has permission to link to the content of the content owner. In another embodiment, the content owner may specify an expiration time (for the authorized link object 350) that is shorter than the expiration time (e.g., lifetime) of the private key and public key pair. For example, the authorized link object 350 may include an (optional) expiration time 355 which may indicate a length of time that the authorized link object 350 may remain valid. In another example, the expiration time 355 may indicate a time (e.g., a date, a timestamp, etc.) after which the authorized link object 350 expires. When the authorized link object 350 includes the expiration time 355, the signature 354 may be generated using the private key of the content owner, the link name 351, and the target content name 352, and the expiration time 355.

FIGS. 4A through 4D are block diagrams illustrating example pending interest tables (PITs) 400A through 400D, in accordance with some embodiments. As discussed above, a router (e.g., router 140 illustrated in Figure) may include multiple network interfaces (e.g., multiple network ports and/or network connections). The router may receive interest messages (e.g., NDN interest messages, CCN interest messages, etc.) and may forward/route interests messages between computing devices (e.g., between a link owner and a content owner). For example, the router may receive an interest message at a first network interface (e.g., a first port) and may forward/route the interest message using a second network interface (e.g., a second port). The router may also receive data objects in response to the interest messages and may forward/route data objects (e.g., NDN data objects, CCN data objects) between computing devices. For example, the router may receive a data object at the second network interface and may forward/route the data object using the first network interface.

The router may include a forwarding information base (FIB). The FIB (not shown in the figures) may be populated by a name-based routing protocol. The FIB may indicate which network interface of the router should be used to forward/route an interest message and/or data object based on prefixes and/or portions of the names in interest messages and/or data objects. For example, an interest message may include the name "/company1/video/video1." The FIB may indicate that interest messages and/or data objects a prefix of "/company1" should be forwarded/routed to the first network interface (e.g., transmitted through the first network interface). The router may also include a PIT. The PIT may store a list of the interest messages that are waiting for returning data objects (e.g., a list of interest messages that have not been satisfied). Each entry in the PIT may include a name of an interest message and a set of network interfaces from which an interest message with the name was received.

Figure 4A:
FIGS. 4A through 4D are block diagrams illustrating example pending interest tables (PITs), in accordance with some embodiments.

As illustrated in FIG. 4A, the PIT 400A includes entry 405. The entry 405 may indicate that a first interest message with the name "/website1/link_auth_service" was received from the third network interface of the router. Referring back to FIG. 2, the entry 405 may be created after interest message 205 is received by the router. The router may use the FIB to determine which network interface should be used to forward/route the interest message 205.

Figure 4B:

As illustrated in FIG. 4B, the PIT 400B includes entry 405 and entry 410. The entry 410 may indicate that a second interest message with the name "/website2/page1/link1" was received from the sixth network interface of the router. Referring back to FIG. 2, the entry 410 may be created after interest message 210 is received by the router. In one embodiment, the first interest message (corresponding to entry 405) may include a second name (e.g., a reflexive name or a data object locator, as discussed above). The name in the second interest message and in the entry 410 may be the second name of the first interest message. In one embodiment, the second name (e.g., "/website2/page1/link1") may be a routable name (e.g., a name with a prefix or portion that may be part of the FIB). The router may use the FIB to route or forward the second interest message if the second name is a routable name. For example, the FIB may indicate the prefix "/website2" of the second name should be routed or forwarded through the sixth network interface of the router. In another embodiment the second name may not be a routable name (e.g., may be a non-routable name). If the second name is not a routable name, the router may use the PIT to determine which network interface should be used to route or forward the second interest message.

Figure 4C:

As illustrated in FIG. 4C, the PIT 400C includes entry 405. The PIT 400C may result from removing entry 410 from the PIT 400B. For example, referring back to FIG. 2, the link owner may transmit the proposed link object to the content owner. The router may receive the proposed link object. The router may access entry 410 to determine that the interest message requesting the proposed link object was received from the sixth network interface of the router and may route or forward the proposed link object using the sixth network interface of the router. The router may remove the entry 410 after routing or forwarding the proposed link object (as illustrated in FIG. 4C).

Figure 4D:

As illustrated in FIG. 4D, the PIT 400D does not include entries. The PIT 400D may result from removing entry 405 from the PIT 400C. For example, referring back to FIG. 2, the content owner may transmit the authorized link object to the link owner. The router may receive the authorized link object. The router may access entry 405 to determine that the interest message requesting the authorized link object was received from the third network interface of the router and may route or forward the proposed link object using the third network interface of the router. The router may remove the entry 405 after routing or forwarding the authorized link object (as illustrated in FIG. 4D).

Figure 5:
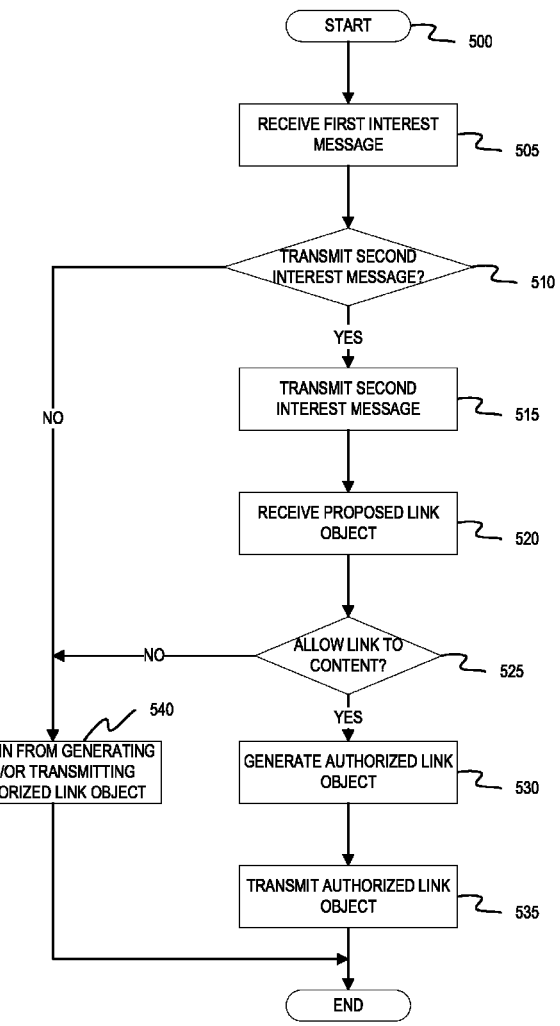
FIG. 5 is a flowchart representation of a method of generating an authorized link object, in accordance with some embodiments.

FIG. 5 is a flowchart representation of a method 500 of generating an authorized link object, in accordance with some embodiments. In some implementations, the method 500 may be performed by a link authorization module and/or a content owner (e.g., link authorization module 111 and/or content owner 110 illustrated in FIG. 1). Briefly, method 500 includes receiving a first interest message, determining whether to allow a link owner to link to content, and transmitting an authorized link object based on the determination. The method 500 begins at block 505 where the method 500 receives a first interest message from a link owner. The first interest message may be a request for an authorized link object. The first interest message may include the name of the link authorization module of the content owner (as discussed above). In one embodiment, the first interest message may also include the name of a proposed link object of the link owner (as discussed above). For example, the first interest message may include a reflexive name or a data object locator (as discussed above). In one embodiment, the name of the proposed link object may be a routable name (as discussed above). In another embodiment, the name of the proposed link object may be a non-routable name (as discussed above).

At block 505, the method 500 includes optionally determining whether to transmit a second interest message. For example, the method 500 may include analyzing the name of the proposed link object to determine whether the link owner is recognized and/or trustworthy (as discussed above). If it is determined that the second interest message should not be transmitted, the method 500 may refrain from generating and/or transmitting an authorized link object at block 540. If it is determined that the second interest message should be transmitted, the method 500 proceeds to block 515 where the method 500 transmit a second interest message to the link owner to request the proposed link object (as discussed above). At block 520, the method 500 may receive the proposed link object. As discussed above, the proposed link object may include a name for the proposed link object, a name for the content that the link owner wishes to link to, and a first signature generated by the link owner. The method 500 may analyze the proposed link object to determine whether the link owner should be allowed to link to the content at block 525. For example the method 500 may analyze one or more of the first signature included in the proposed link object, the name of the proposed link object, and the name of the content (as discussed above).

If it is determined that the link owner should not be allowed to link to the content, the method 500 may refrain from generating and/or transmitting an authorized link object at block 540. If it is determined that the link owner should be allowed to link to the content, the method 500 proceeds to block 530 where the method 500 generates the authorized link object. As discussed above, the authorized link object may include a name for the authorized link object, a name for the content that the content owner is allowing the link owner to link to, the first signature generated by the link owner, and a second signature generated by the content owner. At block 535, the method 500 transmits the authorized link object to the link owner.

Figure 6:
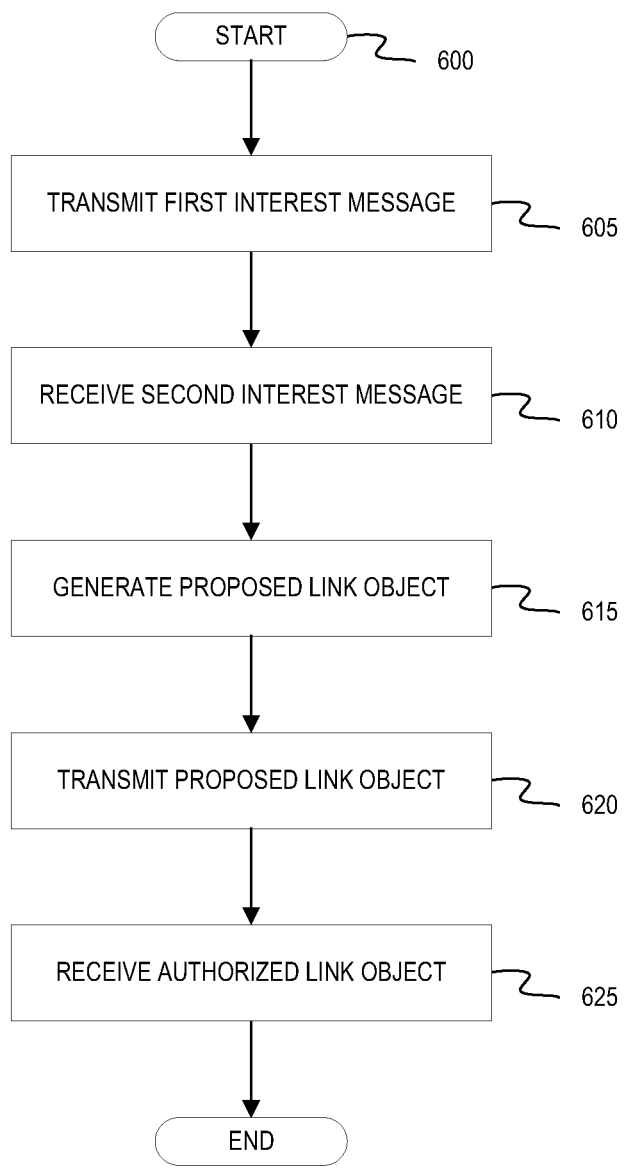
FIG. 6 is a flowchart representation of a method of requesting an authorized link object, in accordance with some embodiments.

FIG. 6 is a flowchart representation of a method 600 of requesting an authorized link object, in accordance with some embodiments. In some implementations, the method 600 may be performed by a link module and/or a link owner (e.g., link module 121 and/or link owner 120 illustrated in FIG. 1). Briefly, method 600 includes transmitting a first interest message, receiving a second interest message, transmitting a proposed link object, and receiving an authorized link object. The method 600 begins at block 605 where the method 600 transmits a first interest message to a content owner requesting an authorized link object. The first interest message may be a request for an authorized link object. The authorized link object may be a link to content of the content owner (e.g., content owned, managed and/or administered by the content owner). The first interest message may include the name of the link authorization module of the content owner (as discussed above). In one embodiment, the first interest message may also include the name of a proposed link object of the link owner (e.g., a reflexive name or data object locator, as discussed above). In one embodiment, the name of the proposed link object may be a routable name (as discussed above). In another embodiment, the name of name of the proposed link object may be a non-routable name (as discussed above).

At block 610, the method 600 receives a second interest message from the content owner. The second interest message may be a request for a proposed link object. In one embodiment, the second interest message may include the name of the proposed link object (as discussed above). At block 615, the method 600 may generate the proposed link object. The proposed link object may include a name for the proposed link object, a name for the content that the link owner wishes to link to, and a signature generated by the link owner (as discussed above). At block 620, the method 600 transmits the proposed link object to the content owner. At block 625, the method 600 receives an authorized link object (e.g., a link to content) from the content owner. For example, the method 600 may receive the authorized link object when the content owner allows (e.g., authorizes and/or permits) the link owner to link to the content of the content owner. As discussed above, the authorized link object may include a name for the authorized link object, a name for the content that the content owner is allowing the link owner to link to, the first signature generated by the link owner, and a second signature generated by the content owner. The authorized link object may also include an expiration time (e.g., to indicate a period of time for which the authorized link object may remain valid). In one embodiment, the method 600 may generate the proposed link object at different points in the method 600 (e.g., may perform block 615 at different points in the method 600). For example, the method 600 may generate the proposed link object before block 605 or may generate the proposed link object between blocks 605 and 610.

Figure 7:
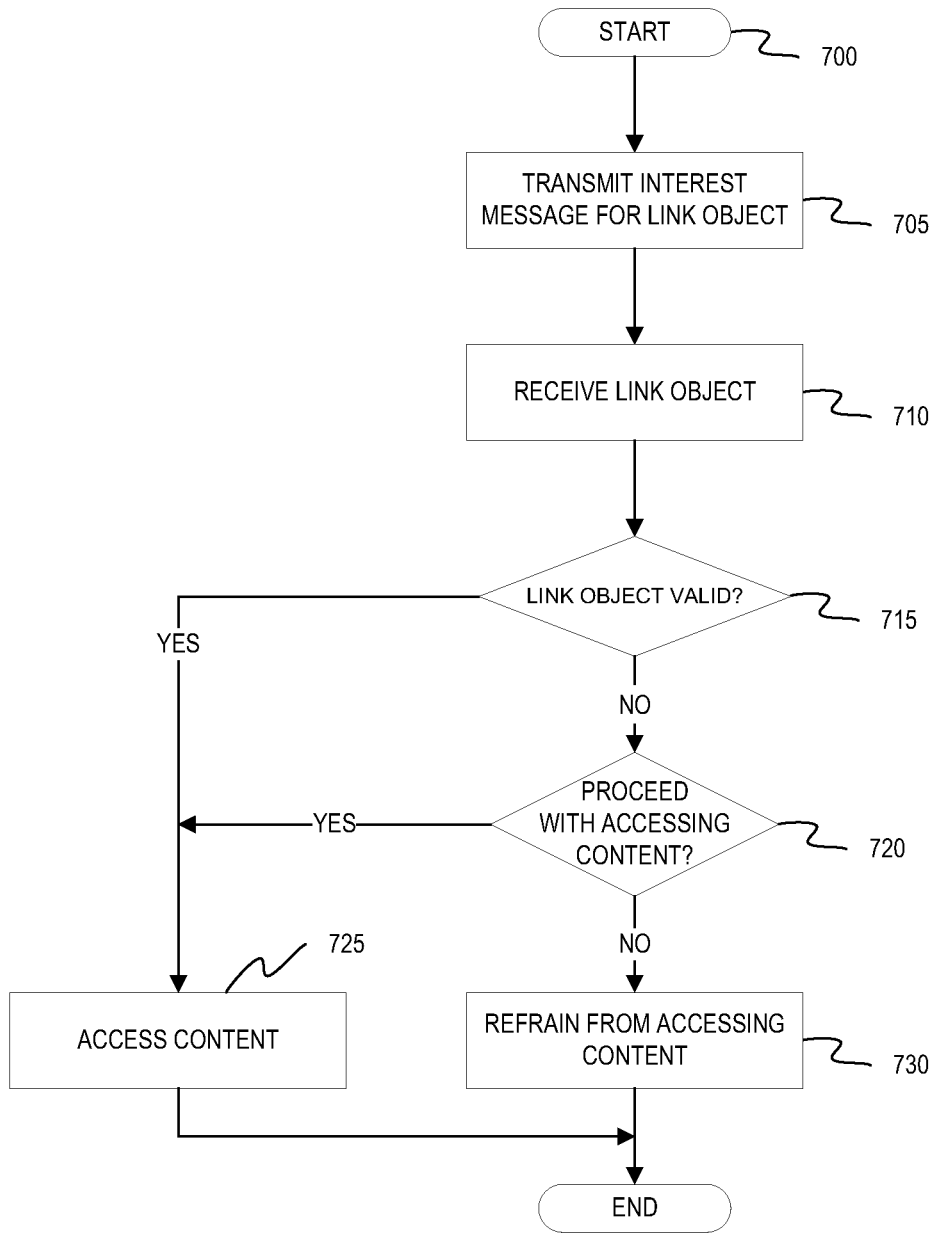
FIG. 7 is a flowchart representation of a method of accessing a link to content, in accordance with some embodiments.

FIG. 7 is a flowchart representation of a method 700 of accessing a link to content, in accordance with some embodiments. In some implementations, the method 700 may be performed by an application and/or a client device (e.g., application 131 and/or client device 130 illustrated in FIG. 1). Briefly, method 700 includes requesting a link object, receiving the link object, and determining whether to access content linked to by the link object. The method 700 begins at block 705 where the method transmits an interest message for a link object to a link owner. The link object may be a link to content of a content owner (e.g., content owned, managed, and/or administered by a content owner). In one embodiment, the method 700 may not transmit an interest message for the link object. The link object may be received as part of other content fetched by the application and/or client device. For example, the authorized link object may be included (e.g., embedded) in a webpage fetched by the application and/or client device. At block 710, the method 700 receives a link object from the link owner. The link object may be an authorized link object. As discussed above, the authorized link object may include a name for the authorized link object, a name for the content that the content owner is allowing the link owner to link to, a first signature generated by the link owner, a second signature generated by the content owner, and/or an expiration time. The method 700 determines whether the link object is valid at block 715. For example, the method 700 may analyze the first signature and the second signature to determine whether the first signature and the second signature are valid. In another example, the method 700 may analyze the public key of the content owner to determine whether the public key has expired. In a further example, the method 700 may analyze an expiration time (e.g., expiration time 355 illustrated in FIG. 3B) of the link object to determine whether the link object is valid. If the link object is valid (e.g., both the first signature and the second signature are valid and/or have not expired, the expiration time has not elapsed, etc.), the method 700 access the content referred to (e.g., linked to) by the link object at block 725.

If the link object is invalid (e.g., if one or more of the first signature and the second signature are invalid and/or have expired), the method 700 may determine whether a user has provided user input indicative of a user request to proceed with accessing the content. For example, the method 700 may determine whether a user has provided user input indicating that the user wishes to access the content even though the link object is invalid. If user input indicative of a user request to proceed with accessing the content is received, the method 700 access the content at block 725. If user input indicative of a user request to proceed with accessing the content is not received, the method 700 refrains from accessing the content at block 730.

Figure 8:
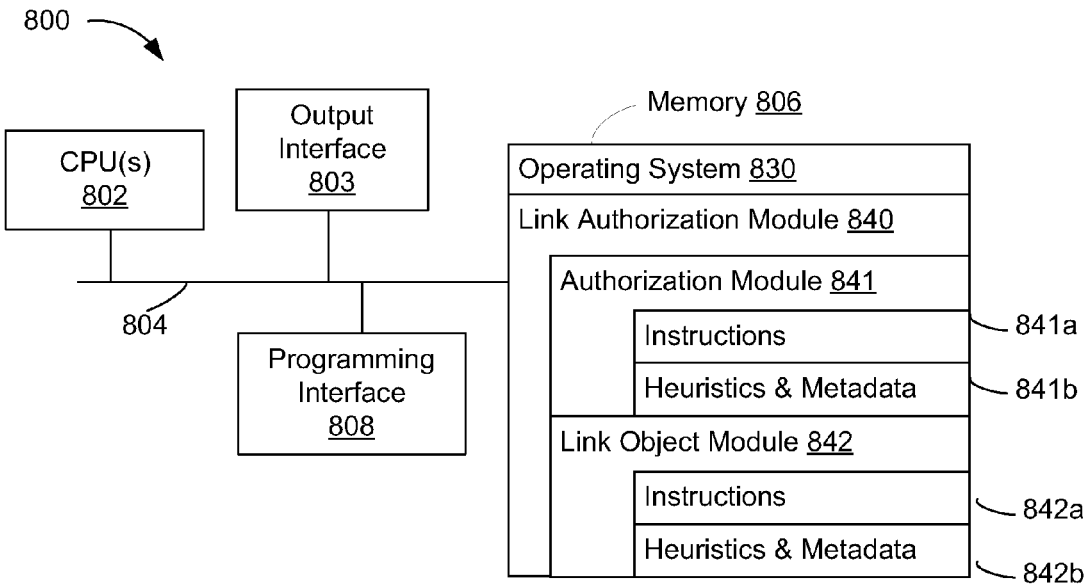
FIG. 8 is a block diagram of a computing device, in accordance with some embodiments.

FIG. 8 is a block diagram of a computing device 800, in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 800 includes one or more processing units (CPU's) 802 (e.g., processors), one or more output interfaces 803, a memory 806, a programming interface 808, and one or more communication buses 804 for interconnecting these and various other components.

In some embodiments, the communication buses 804 include circuitry that interconnects and controls communications between system components. The memory 806 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 806 optionally includes one or more storage devices remotely located from the CPU(s) 802. The memory 806 comprises a non-transitory computer readable storage medium. Moreover, in some embodiments, the memory 806 or the non-transitory computer readable storage medium of the memory 806 stores the following programs, modules and data structures, or a subset thereof including an optional operating system 830 and a link authorization module 840. In some embodiment, one or more instructions are included in a combination of logic and non-transitory memory. The operating system 830 includes procedures for handling various basic system services and for performing hardware dependent tasks. In some embodiments, the link authorization module 840 may be configured to receive a request for an authorized link object, request a proposed link object, and determine whether to transmit the authorized link object to a link owner based on the proposed link object. To that end, the link authorization module 840 includes an authorization module 841 and a link object module 842.

In some embodiments, the authorization module 841 may receive a request for an authorized link object. The authorization module 841 may also be configured to request the proposed link object from the link owner and analyze the proposed link object. To that end, the authorization module 841 includes a set of instructions 841a and heuristics and metadata 841b. In some embodiments, the link object module 842 may be configured to generate the authorized link object based on the proposed link object. To that end, the link object module 842 includes a set of instructions 842a and heuristics and metadata 842b.

Although the link authorization module 840, the authorization module 841, the link object module 842 are illustrated as residing on a single computing device 800, it should be understood that in other embodiments, any combination of the link authorization module 840, the authorization module 841, the link object module 842 may reside in separate computing devices. For example, each of the authorization module 840, the authorization module 841, and the link object module 842 may reside on a separate computing device.

Figure 9:
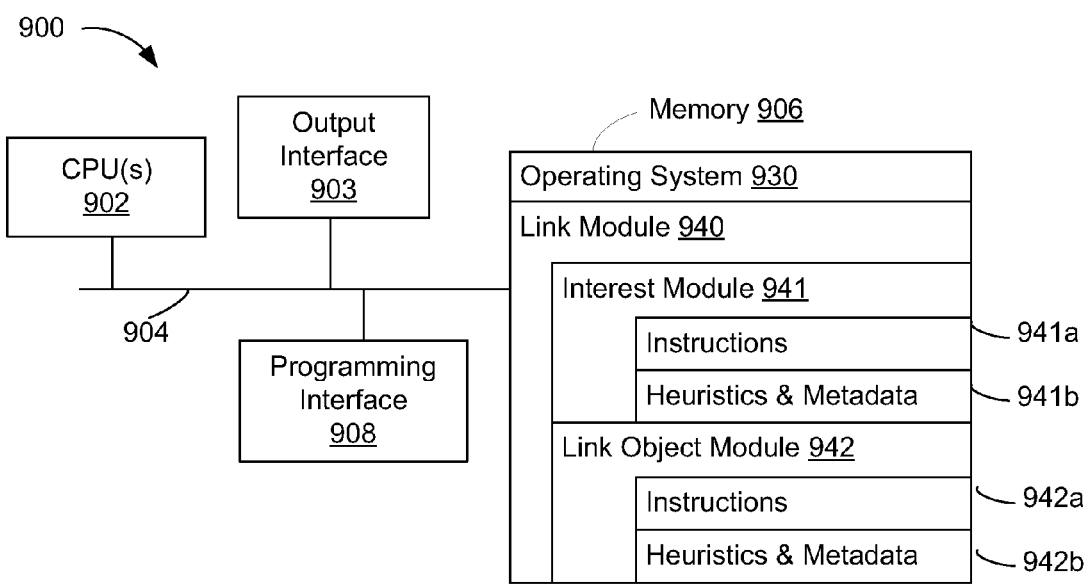
FIG. 9 is a block diagram of a computing device, in accordance with some embodiments.

FIG. 9 is a block diagram of the computing device 900 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 900 includes one or more processing units (CPU's) 902 (e.g., processors), one or more output interfaces 903, a memory 906, a programming interface 908, and one or more communication buses 904 for interconnecting these and various other components.

In some embodiments, the communication buses 904 include circuitry that interconnects and controls communications between system components. The memory 906 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 906 optionally includes one or more storage devices remotely located from the CPU(s) 902. The memory 906 comprises a non-transitory computer readable storage medium. Moreover, in some embodiments, the memory 906 or the non-transitory computer readable storage medium of the memory 906 stores the following programs, modules and data structures, or a subset thereof including an optional operating system 930 and a link module 940. In some embodiment, one or more instructions are included in a combination of logic and non-transitory memory. The operating system 930 includes procedures for handling various basic system services and for performing hardware dependent tasks. In some embodiments, the link module 940 may be configured to request an authorized link object. To that end, the link module 940 includes an interest module 941 and a link object module 942.

In some embodiments, the interest module 941 is configured to transmit a request for the authorized link object and receive an interest message for a proposed link object. To that end, the interest module 941 includes a set of instructions 941a and heuristics and metadata 941b. In some embodiments, link object module 942 is configured to generate the proposed link object and transmit the proposed link object to a content owner. To that end, the link object module 942 includes a set of instructions 942a and heuristics and metadata 942b.

Although the link module 940, the interest module 941, and link object module 942 are illustrated as residing on a single computing device 900, it should be understood that in other embodiments, any combination of the link module 940, the interest module 941, and link object module 942 may reside on separate computing devices. For example, each of the link module 940, the interest module 941, and the link object module 942 may reside on a separate computing device.

Figure 10:
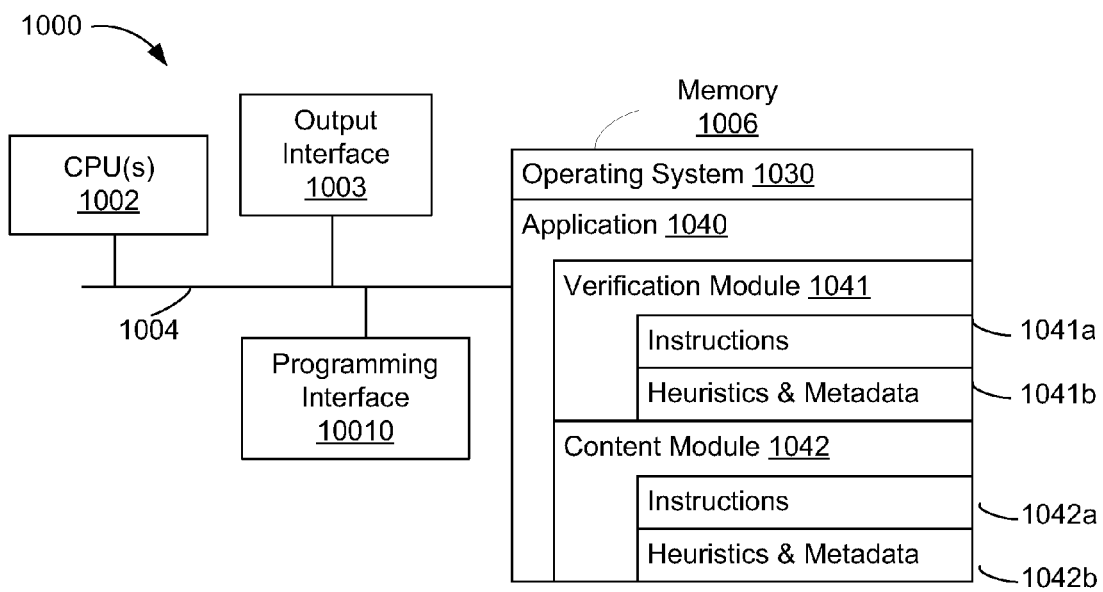
FIG. 10 is a block diagram of a computing device, in accordance with some embodiments.

FIG. 10 is a block diagram of the computing device 1000 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 1000 includes one or more processing units (CPU's) 1002 (e.g., processors), one or more output interfaces 1003, a memory 1006, a programming interface 1008, and one or more communication buses 1004 for interconnecting these and various other components.

In some embodiments, the communication buses 1004 include circuitry that interconnects and controls communications between system components. The memory 1006 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 1006 optionally includes one or more storage devices remotely located from the CPU(s) 1002. The memory 1006 comprises a non-transitory computer readable storage medium. Moreover, in some embodiments, the memory 1006 or the non-transitory computer readable storage medium of the memory 1006 stores the following programs, modules and data structures, or a subset thereof including an optional operating system 1030 and an application 1040. In some embodiment, one or more instructions are included in a combination of logic and non-transitory memory. The operating system 1030 includes procedures for handling various basic system services and for performing hardware dependent tasks. In some embodiments, the application 1040 may be configured to request a link object and determine whether to access content referred to by the link object. To that end, the application 1040 includes a verification module 1041 and a content module 1042.

In some embodiments, the verification module 1041 is configured request a link object and determine whether the link object is valid. To that end, the verification module 1041 includes a set of instructions 1041a and heuristics and metadata 1041b. In some embodiments, content module 1042 is configured to access the content referred by the link object if the link object is valid or if user input indicating that the application 1040 should access the content is received. To that end, the content module 1042 includes a set of instructions 1042a and heuristics and metadata 1042b.

Although the application 1040, the verification module 1041, and the content module 1042 are illustrated as residing on a single computing device 1000, it should be understood that in other embodiments, any combination of the application 1040, the verification module 1041, and the content module 1042 may reside on separate computing devices. For example, the application 1040, the verification module 1041, and the content module 1042 may each reside on a separate computing device.

Moreover, FIGS. 8, 9, and 10 are intended more as functional description of the various features which may be present in a particular embodiment as opposed to a structural schematic of the embodiments described herein. As recognized by those of ordinary skill in the art, items shown separately could be combined and some items could be separated. For example, some functional modules shown separately in FIGS. 8, 9, and 10 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact. Also as used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

Further as used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method, comprising:
at a first computing device that controls access to content that is stored in a data store, the computing device including a non-transitory memory and one or more processors:
receiving, from a second computing device, a first interest message for an authorized link object that links to the content stored in the data store;
transmitting, to the second computing device, a second interest message for a proposed link object that links to the content stored in the data store;
receiving, from the second computing device, the proposed link object, wherein the proposed link object comprises a first signature generated by the second computing device;
determining, based on the proposed link object, whether the second computing device is allowed to link to the content; and
transmitting, to the second computing device, the authorized link object when the second computing device is allowed to link to the content, wherein the authorized link object comprises a first name for the content, the first signature, and a second signature generated by the first computing device indicating that the first computing device has authorized the second computing device to link to the content.

2. The method of claim 1, wherein the first interest message comprises a second name of a link authorization module of the content owner.

3. The method of claim 2, wherein first interest message further comprises a third name for the proposed link object and wherein the second interest message comprises the third name for the proposed link object.

4. The method of claim 2, wherein transmitting the authorized link object comprises:
transmitting a named data networking (NDN) object comprising the authorized link object and the second name.

5. The method of claim 2, wherein transmitting the authorized link object comprises:
transmitting a content centric network (CCN) object comprising the authorized link object and the second name.

6. The method of claim 3, wherein the third name for the proposed link object comprises a non-routable name.

7. The method of claim 3, wherein the proposed link object further comprises the third name for the proposed link object.

8. The method of claim 7, wherein determining whether the second computing device is allowed to link to the content comprises:
analyzing the second name for the proposed link object.

9. The method of claim 1, wherein determining whether the second computing device is allowed to link to the content comprises:
determining whether the first signature generated by the second computing device is valid.

10. The method of claim 1, further comprising:
refraining from transmitting the authorized link object when the second computing device is not allowed to link to the content.

11. The method of claim 1, further comprising:
generating the authorized link object when the second computing device is allowed to link to the content.

12. The method of claim 1, wherein the second signature or a public key of the first computing device is valid for a period of time.

13. The method of claim 1, wherein the authorized link object further comprises an expiration time indicating that the authorized link object is valid for a period of time.

14. A method, comprising:
at a first computing device including a non-transitory memory and one or more processors:
transmitting, to a second computing device, a first interest message for an authorized link object, wherein the authorized link object links to content controlled by the second computing device;
receiving, from the second computing device, a second interest message for a proposed link object;
transmitting, to the second computing device, the proposed link object, wherein the proposed link object comprises a first signature generated by the first computing device; and
receiving, from the second computing device, the authorized link object, wherein the authorized link object comprises a first name for the content, the first signature, and a second signature generated by the second computing device indicating that the second computing device has authorized the first computing device to link to the content controlled by the second computing device.

15. The method of claim 14, wherein the first interest message comprises a second name of a link authorization module of the other computing device.

16. The method of claim 15, wherein first interest message further comprises a third name for the proposed link object and wherein the second interest message comprises the third name for the proposed link object.

17. The method of claim 15, wherein receiving the authorized link object comprises:
receiving a named domain networking (NDN) object comprising the authorized link object and the second name.

18. The method of claim 15, wherein receiving the authorized link object comprises:
receiving a content centric network (CCN) object comprising the authorized link object and the second name.

19. The method of claim 16, wherein the third name for the proposed link object comprises a non-routable name.

20. The method of claim 16, wherein the proposed link object further comprises the third name for the proposed link object.

21. The method of claim 14, wherein the second signature or a public key of the second computing device is valid for a period of time.

22. The method of claim 14, wherein the authorized link object further comprises an expiration time indicating that the authorized link object is valid for a period of time.

23. An apparatus comprising:
one or more processors; and
a memory comprising instructions that when executed cause the one or more processors to perform operations comprising:
transmitting, to a first computing device, an interest message for an authorized link object, wherein the authorized link object links to content controlled by a second computing device;
receiving the authorized link object, wherein the authorized link object comprises a first signature of the first computing device, a second signature of the second computing device indicating that the second computing device has authorized the first computing device to link to the content, a first name of the content and a second name of the link object;
determining whether the authorized link object is valid based on the first signature and the second signature; and
accessing the content when the authorized link object is valid.

24. The apparatus of claim 23, wherein determining whether the authorized link object is valid comprises:
determining whether the first signature is valid; and
determining whether the second signature is valid.

25. The apparatus of claim 23, wherein determining whether the authorized link object is valid comprises:
determining whether a first public key of the first computing device has expired; and
determining whether a second public key of the second computing device has expired.

26. The apparatus of claim 23, wherein the authorized link object comprises an expiration time and wherein determining whether the authorized link object is valid comprises:
determining whether the authorized link object is valid based on the expiration time.

27. The apparatus of claim 23, wherein the operations further comprise:
  refraining from accessing the content when the authorized link object is invalid.

28. The apparatus of claim 23, wherein the operations further comprise:
  providing an indication to a user that the authorized link object is invalid when the authorized link object is invalid;
  receiving user input indicative of a user request to proceed with accessing the content; and
  accessing the content based on the user input.

\* \* \* \* \*